July 23, 1957 A. E. CARROLL 2,800,219
CONVEYOR FOR HANDLING PULVERIZED URANIUM
Filed Sept. 30, 1954 3 Sheets-Sheet 2
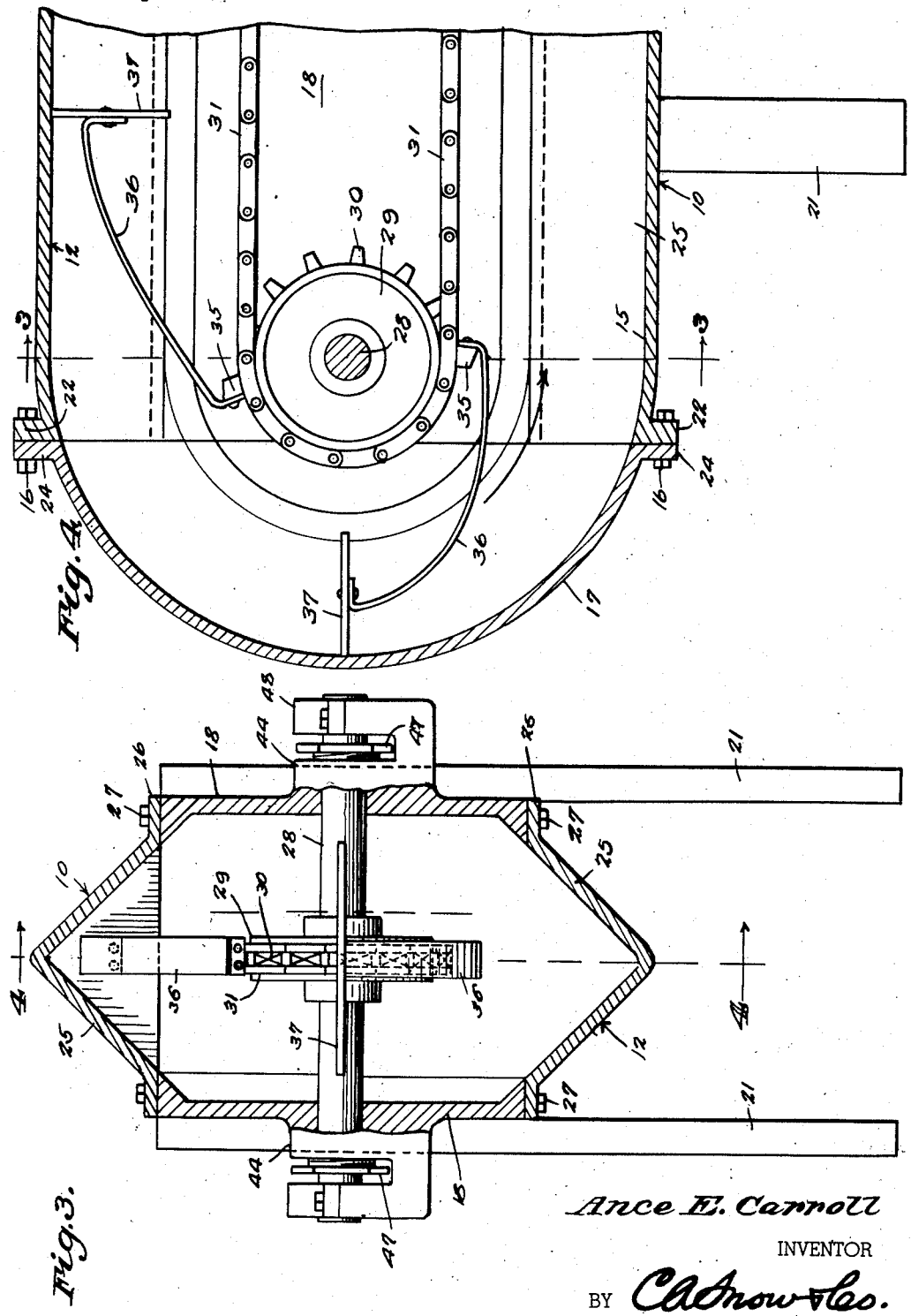
Ance E. Carroll
INVENTOR
BY Cadnow&Co.
ATTORNEYS.

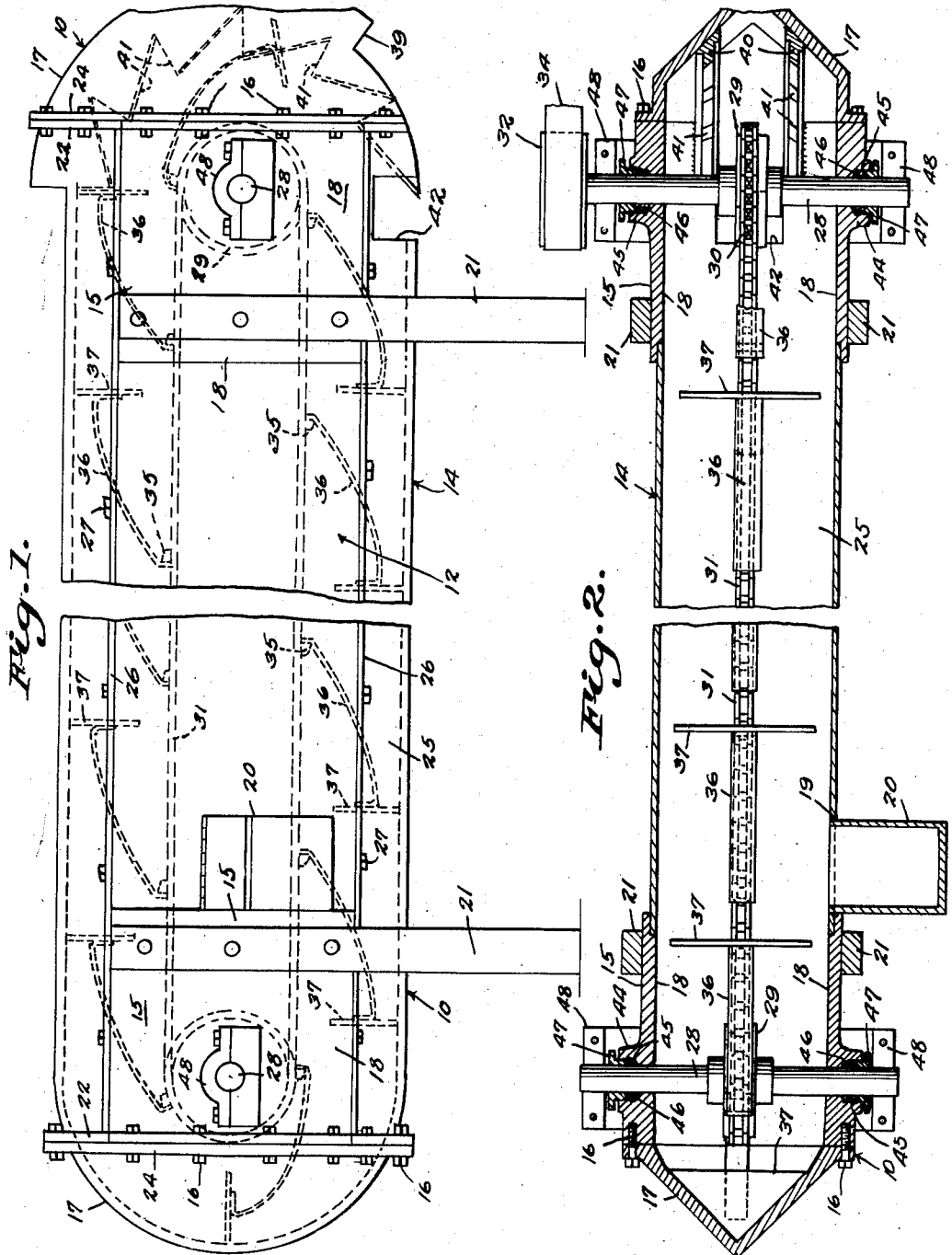

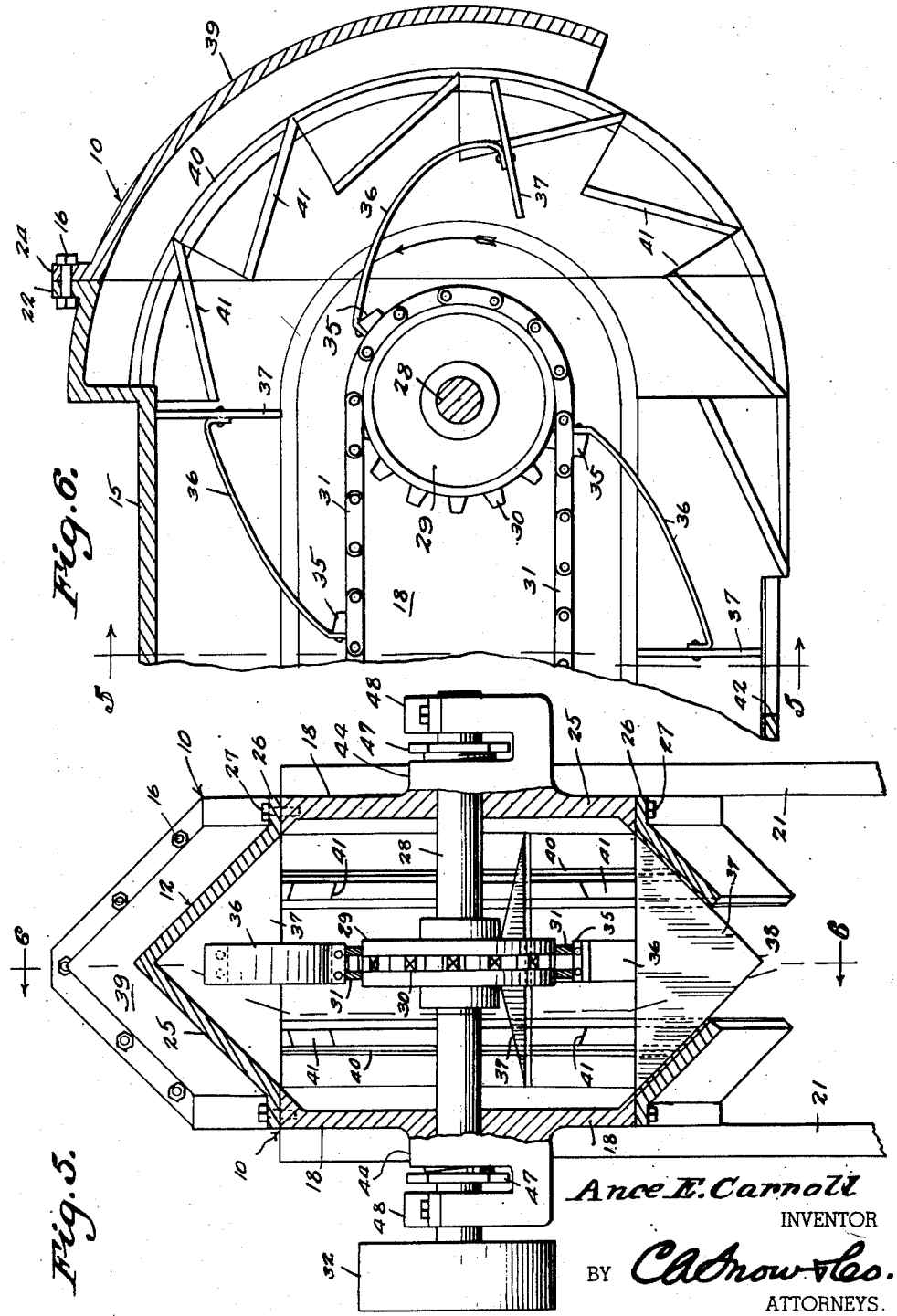

United States Patent Office 2,800,219
Patented July 23, 1957

2,800,219

CONVEYOR FOR HANDLING PULVERIZED URANIUM

Ance E. Carroll, Carrollton, Ga.

Application September 30, 1954, Serial No. 459,463

4 Claims. (Cl. 198—229)

It is an object of this invention to provide a conveyor for handling pulverized uranium in such a manner that the uranium as a dust and any parts thereof will not come in contact with any part of a human being handling the same.

It is a purpose of this invention to provide a conveyor for handling pulverized uranium and the like in such a manner that the entire uranium ore, including the dust thereof, may be handled out of contact with a person who would be burned upon contact with the uranium or otherwise injured.

It is another object of this invention to provide a conveyor for handling pulverized uranium of the kind to be more particularly described hereinafter in which the housing for the conveyor and the conveyor handling scraper drags are sealed from contact with the air so that no dust or any portion of the uranium will be free for movement in and by the free air.

Other and further objects and advantages of the invention will be hereinafter described and the novel features thereof defined in the appended claims.

In the drawings:

Fig. 1 is a side elevation, partly broken away, of a conveyor constructed according to an embodiment of my invention.

Fig. 2 is a longitudinal transverse section of the conveyor taken through Fig. 1.

Fig. 3 is a transverse cross section of the conveyor taken on the line 3—3 of Fig. 4.

Fig. 4 is a fragmentary partial longitudinal section, partly broken away, taken on the line 4—4 of Fig. 3.

Fig. 5 is a transverse cross section of the conveyor, partly broken away, taken on the line 5—5 of Fig. 6.

Fig. 6 is a fragmentary partial longitudinal section of one end of the conveyor, partly broken away, taken on the line 6—6 of Fig. 5.

Heretofore the general type of conveyors available for use in moving uranium from one place to another have proven to be inadequate for such use. Accordingly I have devised the uranium conveyor 10 especially for the use of conveying pulverized uranium from one place to another either in a horizontal flat plane or upwardly from one position to another thereby circumventing any hills or obstructions which may be found in the path of the conveyance of the uranium. While uranium is the particular use for the conveyor 10, as the conveyor is perfectly sealed at all times no uranium dust or any portion thereof may escape from the conveyor to be engaged by the hands or any part of the body of a person working to convey the uranium from one place to another.

The uranium conveyor 10 is formed with a tubular open ended body or substantially tubular housing 12 along which the granular material may be transported when and if desired.

The tubular body 12 has an intermediate housing portion or intermediate body 14 open at the ends thereof with an end portion 15 secured thereon by horizontally extending bolts 16 or other desireably suitable fastening means which the manufacturer may have at the time of the manufacture of the conveyor 10. The end portions 15 of the tubular open ended housing may be substantially cylindrical in configuration or of any other cross section to adequately be sealed onto the tubular open ended intermediate body portion 14 as clearly indicated in Figs. 1 and 2 of the drawings.

The conveyor 10 is formed of wooden or similar material with which the horizontally extending bolts 16 may be used, but when the tubular body 12 and the end portions 15 thereof are made of metal the end portions may be welded to the ends of the intermediate portion 14.

A cap or head 17 is secured on the outer ends of each of the end portions 15, by horizontally extending bolts 16 whether the conveyor is made of metal or some softer material.

Since the intermediate housing 14 of the conveyor 10 is of an assembly of plates, whether wood, metal or plastic the flat walls or check plates 18 are disposed in horizontal relation, one to the other, in such a manner as to provide a vertically arranged flat wall or check plate 18.

One of the check plates 18 is formed with an opening 19 therein which is considered as an inlet opening having an outwardly extending inlet spout 20 secured to the intermediate portion of the housing and conveyor 10 as clearly shown in Figs. 1 and 2 of the drawings.

A supporting leg 21 is disposed on each side of the conveyor 10 at each end of the intermediate housing 14 with the upper end of the supporting leg adequately secured to the conveyor and the lower end thereof depending from the conveyor for engagement on the upper surface of the ground or other fixed supporting surface.

There is provided a radially outwardly extending flange 22 on each end of the housing which confronts a flange 24 on each of the heads or caps 17 and flanges 22 and 24 are secured together in fixed relation to each other by the horizontally extending bolts 16 so that the heads 17 or caps may be removed from the conveyor 10 when and as desired.

The inner surfaces of the conveyor 10 both at the intermediate housing or body 14 and the caps 17 is substantially V-shaped in configuration, there being a horizontally extending flange 26 on the divergent edges of each of the side walls 25 which provide for the securing of the V-shaped inclined walls 25 to the intermediate housing or body 14 by vertically extending bolts 27 as definitely and clearly shown in Fig. 5 of the drawings.

A pair of shafts 28 are rotatably secured to the tubular open ended body 15 one at each end thereof, and each of the shafts 28 has secured thereto a sprocket 29 intermediate the length of the shaft and interiorly of body 15. The sprocket 29 has radially outwardly extending teeth 30 formed substantially integral therewith in the conventional manner of the formation of a sprocket.

An endless chain 31 is trained over each of the sprockets at both ends of the housing 14 so that both of the shafts 28 shall be rotated in unison with each other. One of the shafts 28 is provided with a pulley 32 thereabout which pulley is engaged by a belt 34 which is driven by a prime mover, not shown in the drawings.

A plurality of lugs 35 are secured along the length of the endless chain 31 for the attachment thereon of a flat resilient spring 36 which extends upwardly and outwardly therefrom. One end of the spring 38 being connected onto the lug 35 provides a resilient connection for the V-shaped scraper drag 37 so that the drag may be moved along the length of the conveyor upon the operation of the prime mover, the endless chain 31 and drags 37. The scraper drags 37 being V-shaped in configuration are suitably sealed within the internally V-shaped inclined walls 25 of the housing of the conveyor, the apex 38 of the scraper drags being disposed between the side walls 25 of the conveyor at all times save for the times when the drag 37 is disposed at one end of the conveyor having the discharge opening of the conveyor therein.

One of the heads 17 at one end of the conveyor is provided with a discharge tube 39 thereon. The discharge tube 39 is closed at one end thereof and open at the other end so that the material to be discharged from the conveyor may be moved through the conveyor and into the discharge tube 39 by the scraper drags 37.

Also within the discharge tube 39 the inner walls thereof are provided with guide runners 40 for engagement with the edges of the scraper drags 37 for the reason and reasons to be hereinafter made more evident.

Inclined saw tooth like members 41 providing shoulders, are also disposed within the discharge tube 39 and are arranged in the arc of a circle for engagement with the lower edges of the drags 37, as the drags 37 are moved through the discharge tube 39.

Thus it will be seen that due to the fact that the drags 37 are secured to the free ends of the spring arms 36, the arms 36 will be placed under tension as the drags 37 move over the high sides of the saw teeth 41 or shoulders to the end that the drags will snap over said shoulders, with sufficient force to dislodge material adhering thereto which material then falls into the discharge tube 39 for deposit.

The guide runners 40 in the head 17 are disposed on the opposite sides of the discharge tube with an opening therebetween which opening is in alignment with a cheek opening 42 in an end portion of the housing 14, clearly indicated in Fig. 6 of the drawings.

At the end portions 15 of the housing there is provided a boss 44 for each end of each shaft 38. The boss 44 has a recess 45 therein opening outwardly from the conveyor 10 which recess is filled with a packing 46 within which the portion of the shaft 28 is engageable. A packing nut 47 securely engages the packing 46 in its proper bearing relation to the shaft 28, there being a bearing 48 for the outwardly extending portion of the shaft 28 as clearly indicated in Fig. 2 of the drawings.

By this packing arrangement for the sections of the conveyor 10 and the shafts 28 rotatable therein no loose material may escape from the conveyor and in the case of the use of uranium such material will not injure a person with which it should come in contact.

While the specific details of one embodiment of this invention have been herein shown and described the invention is not confined thereto as changes and alterations may be made without departing from the spirit and scope thereof as defined in the appended claims.

I claim:

1. A conveyor of the kind described for handling pulverized uranium comprising an elongated open ended substantially tubular conveyor housing, supporting means for said housing depending therefrom adjacent the opposite ends thereof, a housing enclosing head detachably engaged on the ends of said housing, rotatable shafts transversely of said housing adjacent said ends thereof, a sprocket secured on each of said shafts intermediate the length thereof, an endless conveyor member trained longitudinally of said housing engaging said sprockets, a plurality of outwardly extending attachment lugs on said conveyor, scraper blades in said housing transversely thereof, elongated longitudinally bowed springs connected between said lugs and said blades, said springs resiliently supporting said blades and constantly urging said blades outwardly to maintain contact of said blades with said housing, means externally of said housing operatively connected to one of said shafts for effecting the rotation thereof, a material entrance opening through a wall of said housing through which material may be passed into said housing, one of said heads on one end of said housing provided with a material discharge opening from which the material may be discharged, stepped inclined knocking members in said one end adjacent said discharge opening progressively engageable with said scraper blades for knocking said material therefrom.

2. A conveyor of the kind described for handling pulverized uranium as set forth in claim 1 wherein said housing is V-shaped internally thereof and said scraper blades are V-shaped externally slidably engageable within said housing.

3. In a conveyor for handling pulverized uranium having a hollow open ended substantially tubular housing and a detachable head on the opposite open ends thereof sealingly closing the ends of said housing, an endless flexible member within said housing and heads, means for moving said endless member longitudinally of said housing, a plurality of scraper drags, longitudinally bowed springs secured to said endless member and said drags resiliently supporting said drags and effecting contact of said drags with said housing, a material inlet through said housing adjacent one end thereof and a material discharge outlet opening adjacent the other end of said housing inclined scraper drag engaging steps in the head adjacent said other end of said housing loosening the material from said scraper drags to be discharged through said discharge opening.

4. In a conveyor as set forth in claim 3, said conveyor housing and heads therefor being internally V-shaped in cross section substantially through the length thereof and said scraper drags being externally V-shaped for engagement within said housing, said means including a prime mover.

References Cited in the file of this patent

UNITED STATES PATENTS

| | | |
|---|---|---|
| 1,338,514 | Majerus | Apr. 27, 1920 |
| 1,953,245 | Mackenzie | Apr. 3, 1934 |
| 2,089,738 | Elmer | Aug. 10, 1937 |
| 2,340,783 | Wegner | Feb. 1, 1944 |
| 2,391,700 | Hapman | Dec. 25, 1945 |
| 2,401,540 | Berlinger | June 4, 1946 |
| 2,624,474 | Hapman | Jan. 6, 1953 |